United States Patent

Gallagher, Sr.

[11] Patent Number: 5,904,248

[45] Date of Patent: May 18, 1999

[54] REUSABLE SHIPPING CONTAINER

[75] Inventor: Robert Eugene Gallagher, Sr., Harrisburg, Pa.

[73] Assignee: The Whitaker Corporation, Wilmington, Del.

[21] Appl. No.: 08/959,611

[22] Filed: Oct. 28, 1997

[51] Int. Cl.[6] ................................................ B65D 19/00
[52] U.S. Cl. ............................ 206/386; 206/499; 220/6
[58] Field of Search ........................... 206/386, 499, 206/505; 220/4.26–4.28, 6, 23.83, 521; 229/101, 101.2

[56] References Cited

U.S. PATENT DOCUMENTS

| | | | |
|---|---|---|---|
| 2,618,380 | 11/1995 | Moore | 206/499 |
| 2,964,229 | 12/1990 | Mansfield | 206/499 |
| 3,148,821 | 9/1964 | Gardiner | 229/101.2 |
| 3,405,835 | 11/1968 | Eby | 220/4.26 |
| 3,926,363 | 12/1975 | Catron | 206/499 |
| 4,744,464 | 5/1988 | Noe | 206/499 |
| 5,417,034 | 5/1995 | Gabler et al. | 53/399 |
| 5,671,857 | 9/1997 | Stromberg | 206/505 |

*Primary Examiner*—S. Thomas Hughes
*Assistant Examiner*—Jermie E. Cozart
*Attorney, Agent, or Firm*—Anton P. Ness; Gerald K. Kita

[57] ABSTRACT

A shipping container (1) has a first compartment (2), trays (3) for carrying articles of manufacture (4) in the first compartment (2), a second compartment (5) receiving the trays (3) that have been emptied of their contents, the first compartment (2) being collapsible against the second compartment (5) that contains the trays (3) to provide a reusable shipping container of reduced volume.

4 Claims, 3 Drawing Sheets

5,904,248

REUSABLE SHIPPING CONTAINER

FIELD OF THE INVENTION

The invention relates to a shipping container, and more particularly, to a shipping container that is collapsed and reused.

BACKGROUND OF THE INVENTION

A known packaging system is described in U.S. Pat. No. 5,417,034. The known packaging system involves a shipping container having multiple trays that carry articles of manufacture. The trays are arranged in a stack within the shipping container.

SUMMARY OF THE INVENTION

The invention addresses a need for a shipping container that can be collapsed and reused together with empty trays in the collapsed container. A shipping container according to the invention has a first compartment containing stacked trays that carry articles of manufacture, and a second compartment that receives each of the trays that has been removed from the first compartment and emptied of its contents. According to a feature of the invention, enclosing walls of the first compartment are collapsible onto the second compartment, and the second compartment contains empty trays, which trays have been removed from the first compartment and emptied of their contents. The shipping container is compact when collapsed, and is returned to its sender for reuse.

Embodiments of the invention will now be described by way of example with reference to the accompanying drawings, according to which:

DETAILED DESCRIPTION

Figure 1:
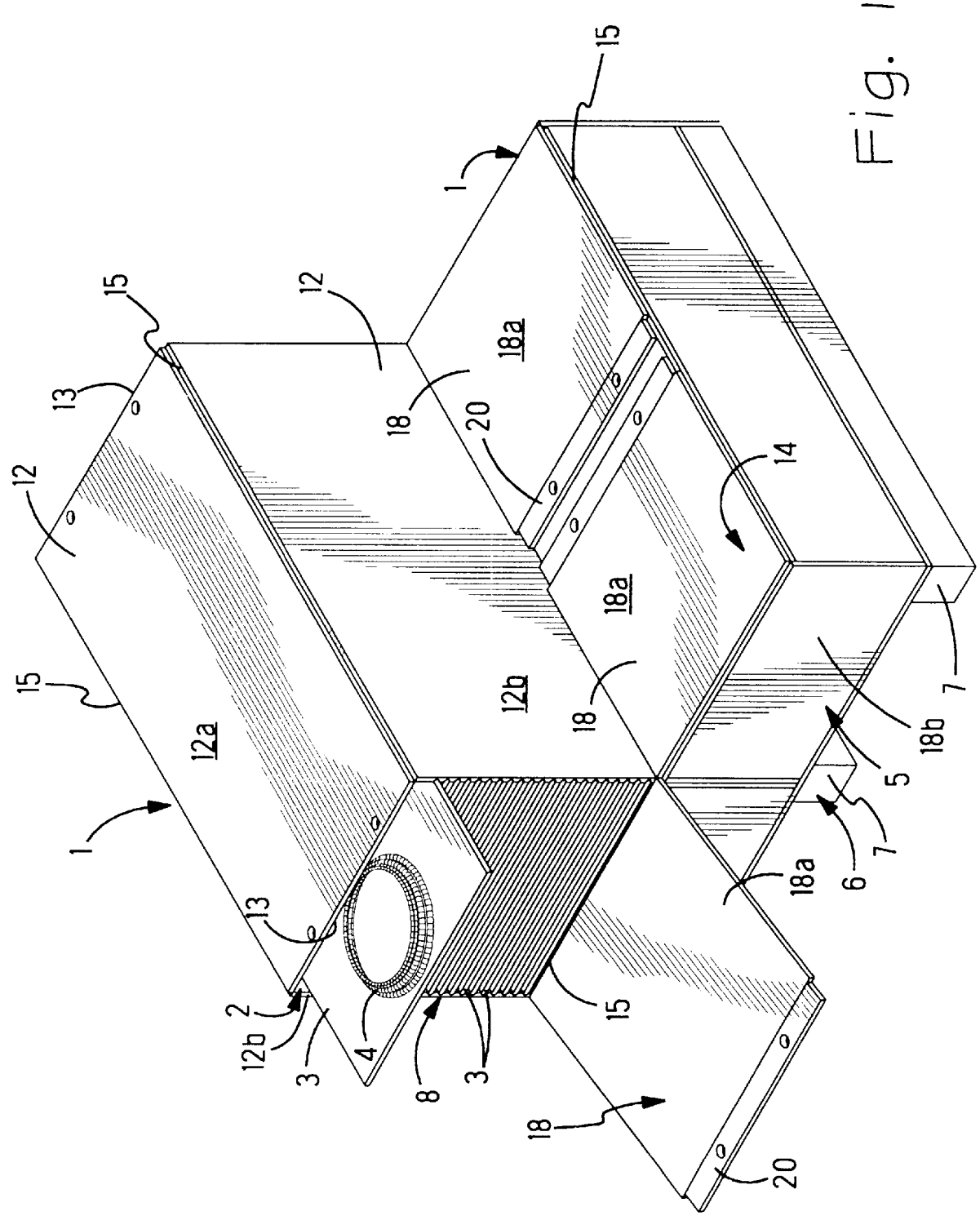
FIG. 1 is an isometric view of two shipping containers each having two compartments, one of which is collapsible, and one of which will contain trays that carry articles for manufacture.
Figure 2:
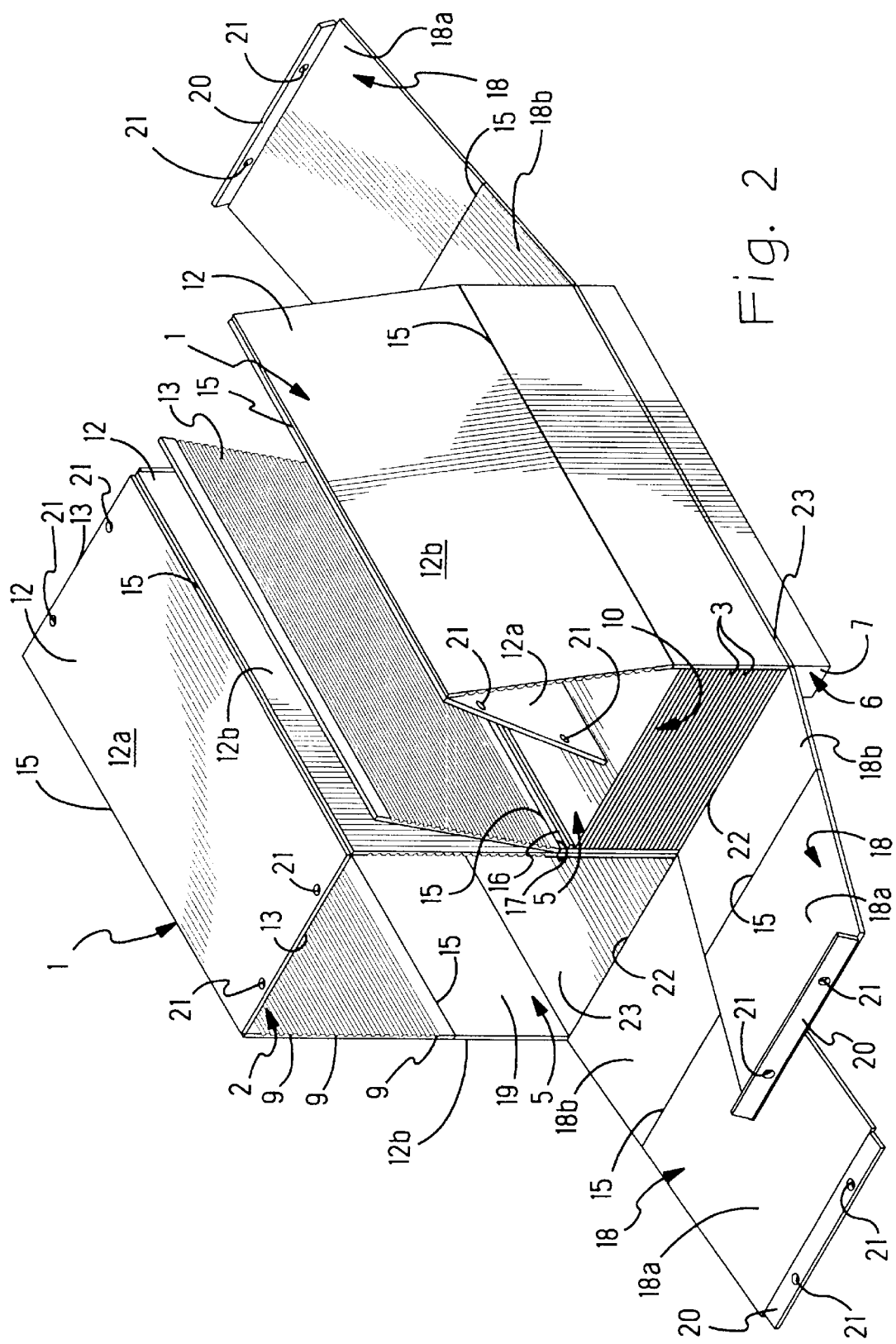
FIG. 2 is an isometric view of two shipping containers each having two collapsible compartments wherein empty trays can be stacked together and received in a second compartment of each container.

With reference to FIGS. 1 and 2, a shipping container (1) comprises, a first compartment (2), multiple trays (3) for carrying articles of manufacture (4) in the first compartment (2), and a second compartment (5). The second compartment (5) opens into the first compartment (2). One of the trays (3) is shown in the first compartment (2), as being partially removed from the first compartment (2) to reveal the contents of the tray (3). The contents of each tray (3) comprises, an article of manufacture (4), for example, a coiled wiring harness. As shown in FIG. 2, the trays (3) have been emptied and are placed in the second compartment (5). As shown in FIG. 2, the second compartment (5) receives the trays (3) that have been emptied of their contents. The second compartment (5) is above a fork lift pallet (6). The pallet (6) has rails (7) that provide a recess under the second compartment (5) for receiving tines of a fork lift truck, not shown. More than one container (1) can be on the same pallet (6). The following description will apply to each container (1).

Figure 3:
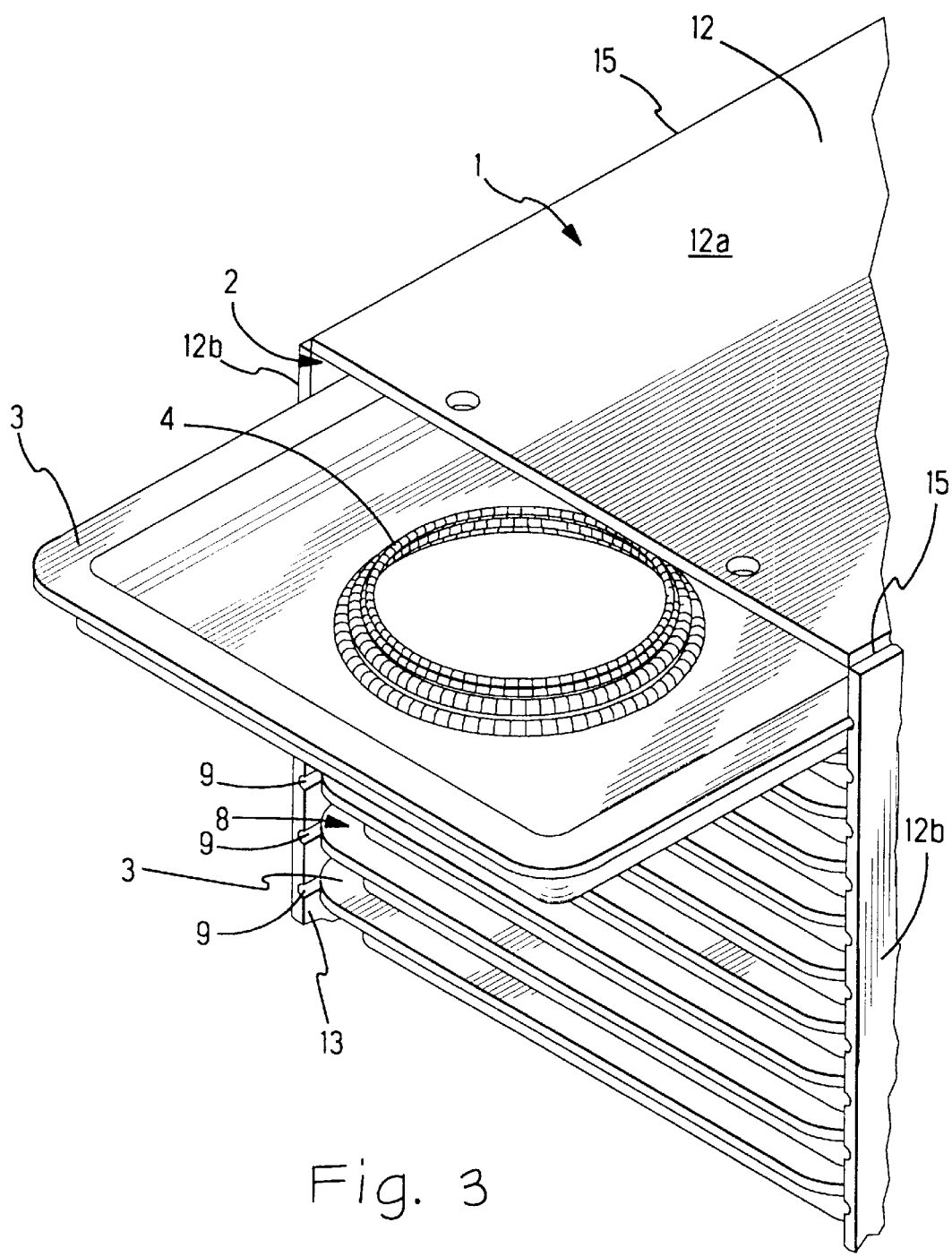
FIG. 3 is a fragmentary view of a nesting tray that carries an article of manufacture.

With reference to FIGS. 1 and 3, the trays (3) are in a stack (8) within the first compartment (2). For example, the trays (3) are stacked in consecutive order according to a sequence by which the contents of the trays (3) are used. For example, trays (3) holding different wiring harnesses are arranged in consecutive order according to a sequence by which the different wiring harnesses are removed from the trays (3). Each of the trays (3) is slidably mounted along grooved tracks (9), FIG. 3, inside the first compartment (2). The tracks (9) space apart the trays (3) and their contents from one another in the stack (8). The contents can be taller than the trays (3) to project outwardly beyond open tops of the trays (3). Once each tray (3) is emptied of its contents, it is replaced in the second compartment (5).

As shown in FIG. 2, emptied trays (3) are stacked together, one over the other, in a compact stack (10) within the second compartment (5). As shown in FIG. 2, the trays (3) can be flat to stack flatly in the stack (10). As shown in FIG. 3, the trays (3) have recessed nests (11) that allow the trays (3) to nest one within the other. The trays (3) nest to form a compact stack (10). The emptied trays (3) form the compact stack (10) in the second compartment (5) that is smaller than the stack (8) of the trays (3) within the first compartment (2).

As shown in FIG. 1, each first compartment (2) is collapsible against the corresponding second compartment (5) that contains the emptied trays (3) to provide a reusable container (1) of reduced volume. The second compartment (5) is smaller than the first compartment (2), which reduces the volume of the container (1) when the first compartment (2) is collapsed.

With reference to FIG. 1, multiple walls (12) enclose the first compartment (2) and the trays (3) in the first compartment (2). The walls (12) encircle open ends (13) of the first compartment (2) to receive the passage of the trays (3) therethrough. The walls (12) are collapsible against the second compartment (5) in a compact stack (14) that is against the second compartment (5). The walls (12) include a top wall (12a) and at least two side walls (12b).

With reference to FIG. 2, the top wall (12a) is collapsed by pivoting along a hinge connection (15) with a corresponding, first, side wall. The hinge connection (15) is in the form of a piano hinge, that is defined as a continuous hinge that extends along an intersection of the first compartment (2) and the second compartment (5).

Each of the side walls (12b) is collapsed by pivoting along a similar hinge connection (15) with the second compartment (5). With reference to FIG. 2, the top wall (12a) is opened, and is separated from one of the side walls (12b), and is pivoted toward the corresponding side wall (12b) to which the top wall (12a) is connected. The top wall (12a) and the corresponding side wall (12b) will be side by side. Then they are pivoted toward the second compartment (5) to register against a ledge (16) on the second compartment (5). They form a beginning portion of the stack (14). Then, a second side wall (12b) is pivoted on its hinge connection (15) to add to the stack (14). As shown in FIG. 2, the hinge connection (15) of the second side wall (12b) is spaced from the ledge (16) to provide a clearance space (17) for receiving the stacked together, top wall (12a) and the corresponding side wall (12b).

With reference to FIGS. 1 and 2, end walls (18) are provided to cover respective open ends (13) of the first compartment (2) and ends (19) of the second compartment (5). A hinged flap (20) on each of the end walls (18) is provided to overlap a top wall (12a) of the first compartment (2). The flap (20) and the top wall (12a) are adapted with aligned holes (21) therethrough to be secured by fasteners, not shown. Thereby, the compartments (2 and 5) are covered for protection during shipping.

With reference to FIG. 1, each of the end walls (18) permanently covers an end (19) of the second compartment (5). With reference to FIG. 2, each of the end walls (18) can be pivoted to open an end (19) of the second compartment (5). Each of the end walls (18) is pivoted along a hinge connection (22) to open the shipping container (1) and reveal the trays (3) in the first compartment (2). Once the trays (3) have been emptied, they are received in an open top of the second compartment (5) to form the compact stack (10) of emptied trays (3). With reference to FIG. 2, the emptied trays (3) can be received in the open top, as well as, through the open ends (19) of the second compartment (5) to form the compact stack (10) of emptied trays (3). As shown in FIG. 2, each of the end walls (18) is pivoted along a hinge connection (22) with a bottom (23) of the second compartment (5), so that each of the end walls (18) can be pivoted along the hinge connection (22) to open the end of the second compartment (5).

After the trays (3) have been emptied, and placed in the second compartment (5), the walls (12) of the first compartment (2) are collapsed in the stack (14). Then, each end wall (18) is pivoted along the hinge connection (22) to close the open ends (19) of the second compartment (5). Each end wall (18) is then pivoted further to join the stack (14), as shown in FIG. 1.

With reference to FIGS. 1 and 2, each end wall (18) has a first portion (18a) and a second portion (18b) joined together along a corresponding hinge connection (15) located at an intersection of the first compartment (2) and the second compartment (5). With reference to FIG. 1, each end wall (18) is collapsed to join the stack (14) formed by the stacked walls (12). Each end wall (18) is collapsed by pivoting along the hinge connection (15). As shown in FIG. 1, the flaps (20) on the end walls (18) are extended to lie flatly in the stack (14).

Although preferred embodiments of the invention have been described, other embodiments and modifications are intended to be covered by the spirit and scope of the appended claims.

What is claimed is:

1. A shipping container comprising:

a first compartment, trays for carrying articles of manufacture in the first compartment, a second compartment receiving respective ones of said trays that have been emptied of their contents, the first compartment being collapsible while the second compartment contains the trays that have been emptied of their contents, end walls cover open ends of the first compartment and the second compartment, a hinged flap on each of the end walls overlaps a top wall of the first compartment, the flap being adapted to be secured by fasteners to the top wall, and each of the end walls has a first portion and a second portion joined together along a hinge connection at an intersection of the first compartment and the second compartment, and a top wall and side walls of the first compartment are collapsible together in a compact stack against the second compartment to provide a reusable container of reduced volume.

2. A shipping container comprising: a first compartment, trays for carrying articles of manufacture in the first compartment, a second compartment for receiving respective ones of said trays that have been emptied of their contents, the first compartment being collapsible against the second compartment to provide a reusable container of reduced volume, wherein, the first compartment and the second compartment have open ends to receive the passage of the trays therethrough, end walls cover respective open ends, each end wall has first and second portions joined by a hinge connection, and each end wall is collapsible by pivoting the first and second portions on the hinge connection.

3. A shipping container as recited in claim 1 wherein, the side walls of the first compartment are joined by hinge connections along intersections of the first compartment and the second compartment, and the top wall of the first compartment is joined by a hinge connection with a corresponding side wall of the first compartment.

4. A shipping container as recited in claim 1 wherein, the trays that have been emptied of their contents nest together in a compact stack of trays, and the second compartment is smaller than the first compartment to receive the compact stack of trays.

* * * * *